United States Patent [19]

Doone et al.

[11] Patent Number: 5,003,689
[45] Date of Patent: Apr. 2, 1991

[54] METHOD AND APPARATUS FOR MANUFACTURING A SURGE ARRESTER

[75] Inventors: Rodney M. Doone; Henry J. Colbert, both of Burgess Hill, England

[73] Assignee: Bowthorpe EMP Limited, Brighton, England

[21] Appl. No.: 489,862

[22] Filed: Mar. 5, 1990

Related U.S. Application Data

[63] Continuation of Ser. No. 366,842, Jun. 15, 1989, abandoned, which is a division of Ser. No. 924,486, Oct. 29, 1986, Pat. No. 4,851,955.

[30] Foreign Application Priority Data

Jan. 29, 1986 [GB] United Kingdom ............... 8602112

[51] Int. Cl.$^5$ .......................................... H01C 17/02
[52] U.S. Cl. .................... 29/613; 361/127; 156/294; 156/86; 156/286
[58] Field of Search ............. 29/613, 631; 338/21; 361/117, 126, 127; 156/294, 86, 286

[56] References Cited

U.S. PATENT DOCUMENTS

| | | | |
|---|---|---|---|
| 3,227,983 | 1/1966 | Braun | 361/126 |
| 4,218,721 | 8/1980 | Stetson | 361/117 |
| 4,276,578 | 6/1981 | Levinson et al. | 361/127 |
| 4,404,614 | 9/1983 | Koch et al. | 361/128 |
| 4,456,942 | 6/1984 | Bronikowski | 361/127 |
| 4,476,513 | 10/1984 | Stenström | 361/127 |
| 4,571,660 | 2/1986 | Mitsumatsu et al. | 361/127 |

FOREIGN PATENT DOCUMENTS 1242068 8/1971 United Kingdom .

Primary Examiner—P. W. Echols
Attorney, Agent, or Firm—Pollock, Vande Sande & Priddy

[57] ABSTRACT

A distribution class surge arrester comprises a core formed of distributed zinc oxide varistor blocks, aluminum blocks acting as heat sinks and as spacers providing voltage grading and required arcing distances, and terminal blocks held in face-to-face contact by means of a glass reinforced epoxy shell which is formed by winding a pre-preg onto the assembled blocks and thermally curing under mold pressure within an evacuated mold. The core is housed within a polymeric shedded housing which is formed by shrinking a heat-shrink shedded sleeve onto the core with a sealant provided in the interface of the core and the sleeve, and end caps are sealed to the ends of the structure thus formed. The all solid-state arrester thus formed has performance and cost advantages over conventional porcelain housed arresters and furthermore has very considerable physical strength enabling it to serve additionally as a stand-off support insulator in situation where conventionally separate arrester and support insulators were required.

9 Claims, 10 Drawing Sheets

Type EA

Type EB

WRAPPING METHORD

① MANDREL WRAPPER

② 3-ROLL M/C

③ ROLLING TABLE

METHOD AND APPARATUS FOR MANUFACTURING A SURGE ARRESTER

This application is a continuation of application Ser. No. 07/366,842, filed Jun. 15, 1989 now abandoned, which is a Division, of application Ser. No. 924,486, filed Oct. 29, 1986 now U.S. Pat. No. 4,851,955.

FIELD OF THE INVENTION

This invention concerns improvements in or relating to electrical surge arresters, also known as electrical surge diverters, as used particularly, though not exclusively, in electrical power distribution systems for the safe handling of atmospherically induced surges, arising from lightning strikes, for instance, and over-voltages caused by switching operations.

BACKGROUND OF THE INVENTION

As is well known in the surge arrester art, and as is described, for example, in Adveenko et al U.S. Pat. No. 4,298,900, issued Nov. 3, 1981, surge arresters commonly have comprised a non-linear voltage-dependent resistor arrangement contained within the bore of an externally shedded glazed porcelain insulator housing. The non-linear resistor arrangement commonly has comprised a series arrangement of varistor elements formed principally of silicon carbide or zinc oxide, for example, and, as disclosed in Matsuoka et al U.S. Pat. No. 3,805,114, issued Apr. 16, 1974, the varistor elements can be in series with one or more discharging or spark gaps. In the event of a voltage surge on a line connected to ground (earth potential) by way of the surge arrester, the spark gaps are adapted to spark over and to put a transient earth fault on the line for the duration of the surge, the series varistor elements adopting a temporary low resistance condition such as to limit the power follow current which can flow through the arrester to a level which can be cleared by the spark gaps.

The commonly utilized porcelain housing has placed severe and serious constraints upon the manufacture of surge arresters. It has been conventional to vacuum dry the assembly of the non-linear resistor arrangement with the porcelain housing and to fill the arrester with an inert gas prior to final sealing. It is also conventional, particularly in the case of larger sized, station class arresters but also in the case of smaller distribution type arresters, to provide a pressure relief diaphragm at one or both ends of the porcelain insulator housing, as disclosed for example in U.S. Pat. No. 4,298,900 abovementioned, with such diaphragm(s) being adapted to rupture in the event of an over-pressure occurring in the gas filling of the arrester as a result of the expansion of this gas when the arrester operates to divert a current surge to ground. The purpose of these provisions has been to protect the porcelain housing against explosive shattering which otherwise can occur with corresponding risk to life and property; the bush fires which in recent years have ravaged vast areas of Australia are believed to have been caused, in some instances at least, by explosive shattering of porcelain arrester housings and the resultant spewing out of high temperature fragments over an area of several hundred square yards.

The cost of the porcelain housing itself contributes very significantly to the cost of a conventional surge arrester provided with such a housing, and the cost of the treatments and arrangements which have been considered necessary to minimize or isolate the danger it presents by virtue of its risk of explosive shattering have caused the overall cost of a surge arrester to be relatively high. Given these disadvantages, there have been various previous attempts to construct a surge arrester, suitable at least for electrical power distribution applications, which does not use a porcelain insulator housing, but to our knowledge and belief no such surge arrester has been commercially available.

In British Patent 867901 (Westinghouse), issued May 10, 1961, the above and other disadvantages of porcelain housings in surge arresters are discussed, and it is proposed instead to use a plastic molded housing encasing the spark gaps and varistor blocks. However, the patent goes on to discuss problems of deterioration of the plastic housing by exposure to the ultraviolet radiation in sunlight, and proposes as one solution to these to shroud the polyethylene housing within an outer porcelain housing. This patent thus seeks to solve the problems of porcelain housings by means of a solution which itself gives rise to such problems as to invite the addition of a porcelain housing to alleviate them. The problems of porcelain arrester housings are also discussed in Westrom U.S. Pat. No. 3,727,108, issued Apr. 10, 1973, which proposes instead to encapsulate the spark gaps and varistor blocks of the arrester within a housing formed of elastomeric material. In West German Patent 1,638,120 (Siemens AG), there is disclosed a surge arrester in which the arrester housing is of molded synthetic resin material. Despite these prior proposals, surge arresters to the present day commonly comprise porcelain housings, notwithstanding the problems associated therewith.

Yet another proposal is contained in British Patent 2,073,965, assigned to the assignees of the present invention and issued May 2, 1984, and comprises a surge arrester formed as a stack of varistor blocks capped at each end by means of an appropriate termination and with a shedded sleeve of heat-shrink material encasing the assembly, the heat-shrink material being a high voltage electrical insulator capable of withstanding the electric potential of a lightning strike, for example, without dielectric breakdown. Such a surge arrester promised to provide an elegant and advantageous solution to the porcelain insulator problem and with other advantages of ease of fabrication and cost benefit. However, while the design of the proposed surge arrester was elegantly simple and is theoretically viable, experience has shown that the proposed arrester did not lend itself to volume manufacture.

A similar surge arrester to that proposed in British Patent 2,073,965 abovementioned is described in Russian Patent Specification 853,728, and comprises a stack of varistor blocks interleaved with metal contact plates and encased within a heat-shrink material housing. The surge arrester described in this Russian patent is not considered to be to an efficacious design on account of the inevitability that the shrinking down of the heat-shrink material housing onto the assembled varistor blocks and metal contact plates would entrap air, thereby leading to risk of local ionization and flashover failure of the arrester. The disclosure of this Russian patent thus does not provide a solution to the problems of prior art surge arresters.

OBJECTS AND SUMMARY OF THE INVENTION

It is therefore a principal object of the present invention to provide a surge arrester wherein the outer shedded housing of the arrester is formed of heat-shrink material or a mechanically released elastomeric material and wherein the design of the arrester is such as to lend itself to volume production.

Another object of the invention is to provide a solid state surge arrester which can be produced relatively simply and consistently and does not present the hazardous risk of explosive fragmentation associated with conventional porcelain housed arresters, and furthermore has no requirement for special pressure-relief facilities such as rupturable diaphragms on account of exhibiting zero air entrapment.

Yet another object of the invention is to provide a surge arrester which is of such robust construction that it can advantageously be utilized in place of a support insulator in a cabling system, thereby performing the dual functions of surge arrester and support insulator and dramatically reducing installation and accessory costs, while diminishing the environmental detraction caused by complex and unsightly installations.

Yet another object of the invention is to provide advantageous methods for the manufacture of the subject arrester.

These and other objects of the invention are achieved by utilizing a surge arrester construction wherein varistor valve blocks, formed of zinc oxide non-linear resistor material, for example, and similarly shaped metal heat sink/spacer elements are formed into a distributed linear array between first and second metal terminal blocks, and the said array is structurally stabilized by being encased within a shell of glass fiber reinforced epoxy resin material (or the like) which is firmly bonded to the external surface of the array. The thus formed structurally stabilized array is then utilized as the core assembly for a surge arrester wherein an outer housing of heat-shrink or mechanically-released elastomeric material advantageously formed with integral sheds is provided onto the core assembly. The glass fiber reinforced epoxy resin shell serves to retain the valve blocks, the terminal blocks and the heat sink/spacer elements in intimate face contact with each other, and is applied in a manner to avoid air entrapment within the structure or resin intrusion between the respective parts. The resulting core assembly displays a very high degree of structural integrity even under the most testing conditions.

Varistor valve blocks are commonly available in cylindrical form with metallized aluminum contacts on their flat end faces and with their circumferential curved surface coated with an electrically insulating material. The heat sink/spacer elements are preferably formed of aluminum or an aluminum alloy as cylinders of the same diameter as the varistor valve blocks. The varistor valve blocks are provided in sufficient number to give the desired electrical resistance characteristics for the arrester, and the heat sinks/spacers are provided in sufficient number to give the arrester a sufficient length between its terminals to enable it to withstand its rated voltage without arcing, and are distributed with the valve blocks so as to grade the voltage drop throughout the overall length of the arrester.

The reinforced plastic shell could be provided as a preformed tube within which the valve blocks, the terminal blocks and the heat sinks/spacers are assembled and potted with synthetic resin material, but it is preferred in accordance with this invention to first assemble the valve blocks, the terminal blocks and the heat sinks/spacers in their desired array and then to wrap a pre-preg material comprising a resin impregnated textile fabric or mat of fibrous reinforcing material about the array with the array held in axial compression, and thereafter cure the resin. It is necessary, as will be appreciated, to ensure that no air is entrapped within voids in the core assembly, and to this end the invention proposes to cure the resin in the pre-preg material within an evacuated mold arranged to form the resin material closely about the valve block array; various methods and apparatuses for achieving this will be described hereinafter.

Having thus formed the arrester core, the assembly to the core of the outer housing of heat-shrink material (sometimes referred to as heat-recoverable material) or mechanically released elastomeric material is a simple matter. Heat shrink sleeves with integral sheds which are suitable for this purpose are available from Raychem Limited and are the subject of Raychem's British Patents 1,530,994 and 1,530,995 the disclosures whereof are incorporated herein by reference. The heat-shrink material has desirable anti-tracking and other electrical properties which adapt it to utilization as a high voltage electrical insulator. A mastic sealant is utilized within the heat-shrink sleeve to ensure that the interface between the outer housing of heat shrink material and the reinforced plastic shell of the arrester core is void free and impervious to moisture penetration, etc., and such mastic sealant is also available from Raychem Limited. As an alternative to heat-shrink material, an elastomeric material could be used, the elastomer sleeve being mechanically expanded and introduced onto the core and then being released so as to elastically contract into tight engagement with the core surface, a weatherproof sealant preferably sealing the interface between the core and the elastomer sleeve.

We have found that surge arresters constructed in accordance with the present invention exhibit a very high physical strength. In many electrical power distribution systems it is conventional, for example where an overhead aerial line connects to a buried cable, to support the connection of the cable end to the line by means of a so-called support insulator, commonly comprising a shedded dielectric body formed of porcelain for example or as a dielectric core within a polymeric sleeve, and to provide as a separate component a surge arrester coupled between the line and ground. By virtue of the considerable strength of a surge arrester constructed in accordance with the present invention and its non-explosive failure mode performance, the conventional arrangement can be modified by dispensing with the support insulator altogether and utilizing the surge arrester also as support insulator. This has significant cost and environmental advantages.

The invention also extends to an apparatus specifically designed for enwrapping a cylindrical surge arrester core with several turns of a sheet of pre-preg material such as a synthetic resin impregnated glass fiber mat or fabric, the said apparatus comprising means for feeding pre-preg material in sheet form to a cutter for forming pre-preg blanks of predetermined size, a heated platen for receiving said blanks, and means for rolling a said arrester core upon a said blank received upon said platen so that the core takes up the blank as a plural turn wrapping therearound.

For curing the thus pre-preg enwrapped surge arrestor core and simultaneously consolidating or molding the resin impregnating the pre-preg, the invention further provides a vacuum bag molding apparatus into which one or more (and preferably a substantial plurality) pre-preg enwrapped arrester cores, suitably encompassed within a release material sheet which is non-adherent to the resin, can be loaded, the said apparatus when evacuated being arranged such that flexible molding sheets collapse onto and compress the arrester cores. The vacuum bag molding apparatus further is arranged to be autoclavable for further pressurizing and for heating the arrester cores in order to achieve void-free curing of the resin material in the pre-preg and a smooth and defect-free cured resin surface well adapted to mate with the subsequently added external elastomeric or heat-shrink material housing of the arrester.

For heat-shrinking heat-shrink material sleeves onto pre-formed arrester cores, the invention also provides a specially designed vacuum oven as hereinafter described.

BRIEF DESCRIPTION OF THE DRAWINGS:

Other features and advantages of the present invention will be better understood upon consideration of the following description of exemplary embodiments of the invention and of the appended claims, the embodiments being described with reference to the accompanying drawings.

FIGS. 5-1, 5-2 and 5-3 schematically illustrate alternative methods of wrapping an array of varistor valve blocks, heat sink/spacer blocks and terminal blocks with pre-preg material;

FIGS. 6—1 to 6—6 show schematically various different views of an exemplary pre-preg wrapping machine;

FIGS. 7-1 and 7-2 show schematically a vacuum molding apparatus for molding and curing pre-preg wrapped surge arrester cores;

FIGS. 8-1 and 8-2 show schematically a vacuum oven for heat-shrinking the external heat-shrink material housings onto pre-formed surge arrester core assemblies.

DESCRIPTION OF THE EMBODIMENTS

Figure 1:
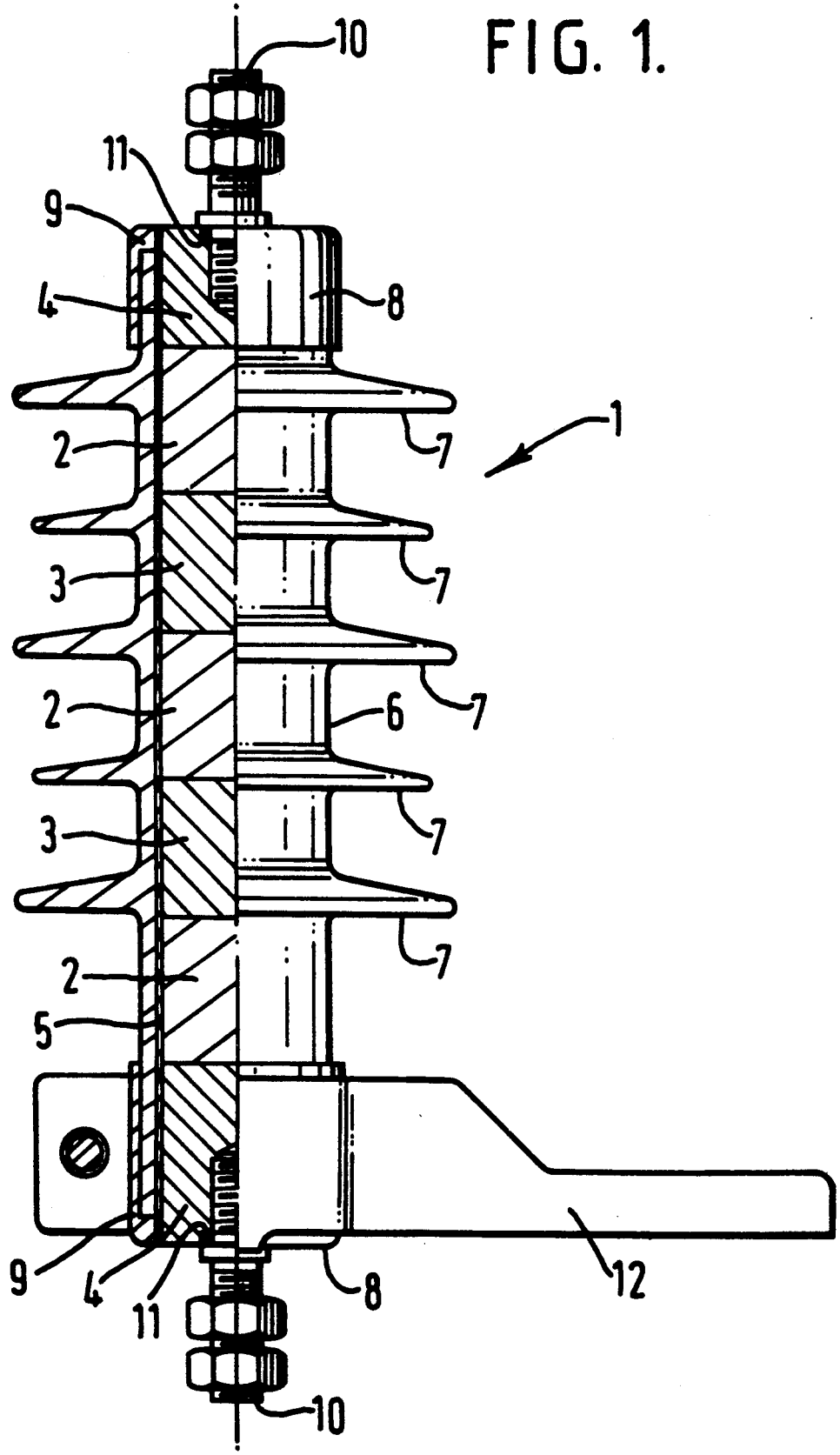
FIG. 1 shows an exemplary surge arrester constructed in accordance with the present invention in part sectional, part side-elevational view.

Referring to FIG. 1, shown therein partly in sectional view and partly in side elevation view is a surge arrester 1 embodying the invention. The surge arrester 1 comprises metal oxide varistor blocks 2, aluminum alloy heat sink/spacer blocks 3 and terminal blocks 4 structurally combined within a glass reinforced plastic shell 5 which is bonded to the outer cylindrical surfaces of the blocks 2, 3 and 4. The varistor blocks 2, heat sink/spacer blocks 3, terminal blocks 4 and the glass reinforced plastic shell 5 constitute a unitary structural arrester core of great physical strength wherein the facing surfaces of the respective blocks are held in face-to-face physical and electrical contact without air entrapment or bleed of plastic material. A heat-shrink sleeve 6 with integral sheds 7 of alternating greater and lesser diameter as shown is shrunk about the arrester core with inter-positioning of a fluid mastic material to ensure that the interface between the heat-shrink sleeve and the outer surface of the arrester core is free of voids or air entrapment and cannot be ingressed by moisture. Stainless steel end caps 8 are fitted to each end of the arrester with a silicone rubber or like sealant 9 filling the spaces between the interior of the end caps and the arrester core, and stainless steel terminal assemblies 10 are screw-threadedly engaged with the terminal blocks 4 with seals 11 provided to prevent moisture ingress into the mated screw threads. A galvanized steel mounting bracket 12 is shown clamped to the lower end of the arrester about the lower end cap 8. It is to be noted that the skirt portions of the end caps 8 must terminate on a level with the juncture between the respective terminal block 4 and the varistor block 2 in contact therewith to avoid the establishment of voltage gradients at these two positions which otherwise could detrimentally affect the intervening dielectric material.

The metal oxide varistor blocks 2 are commercially available from Meidensha, for example, and preferably comprise zinc oxide non-linear resistor material. The heat-shrink sleeve 6 is available from Raychem and can be sealed against the glass reinforced plastic shell 5 by means of Raychem PPS 3022 sealant, for example, and the same sealant could be used for sealing the end caps 8 against the polymeric heat shrink material.

Figures 1, 2:
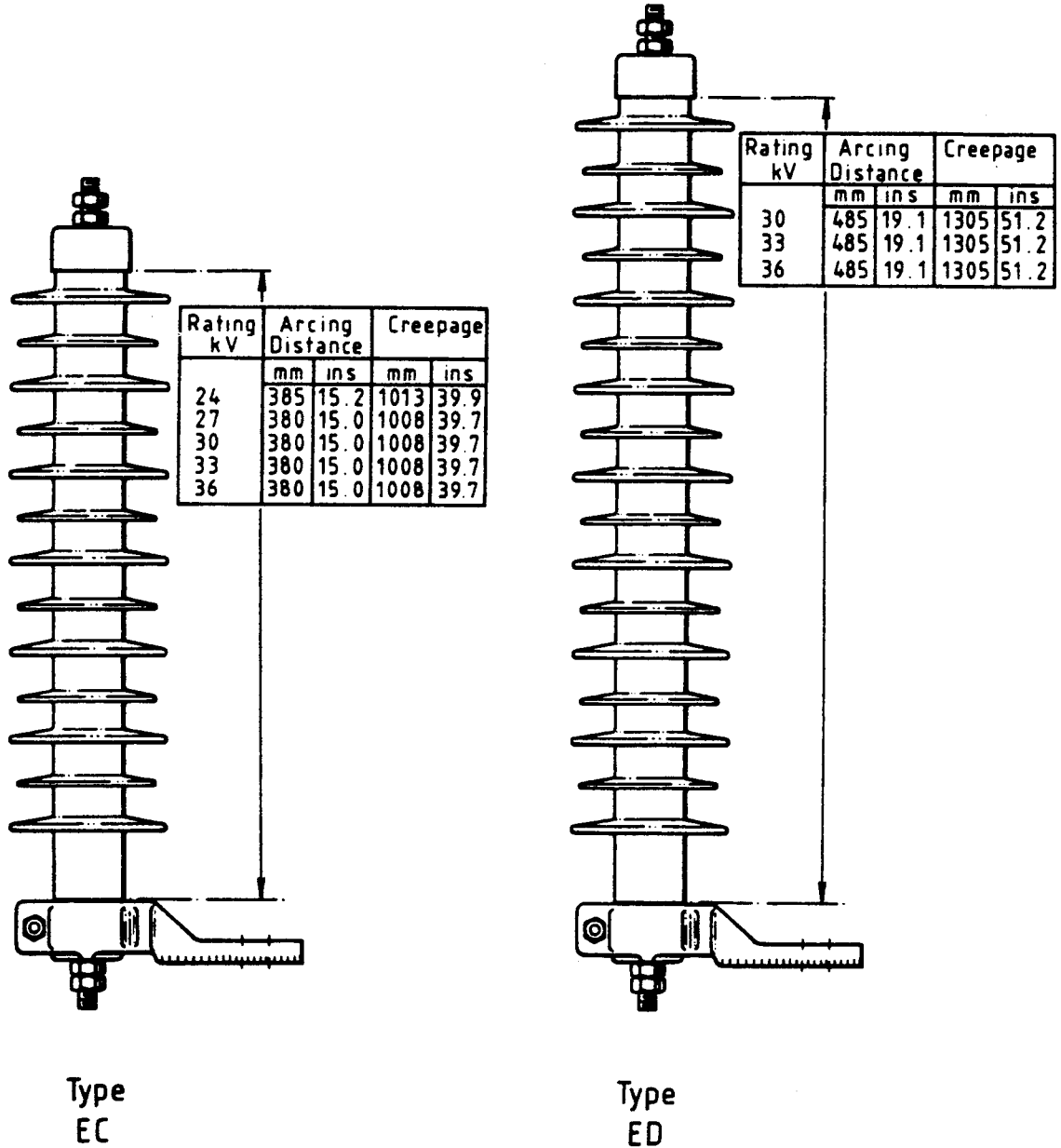
FIG. 2 shows a variety of differently rated surge arresters constructed in accordance with the constructional principles of the surge arrester of FIG. 1.
Figure 2:
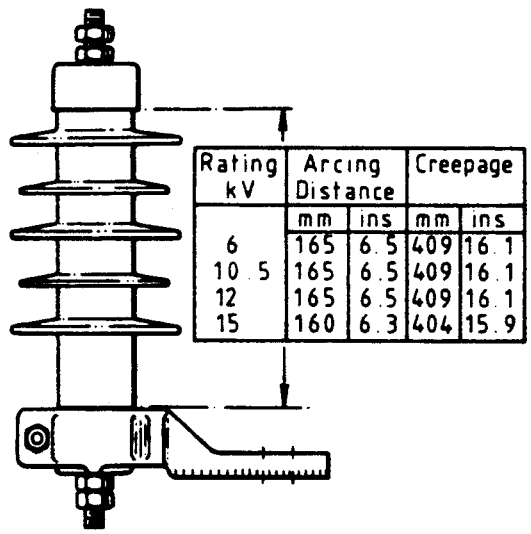
Figure 2:
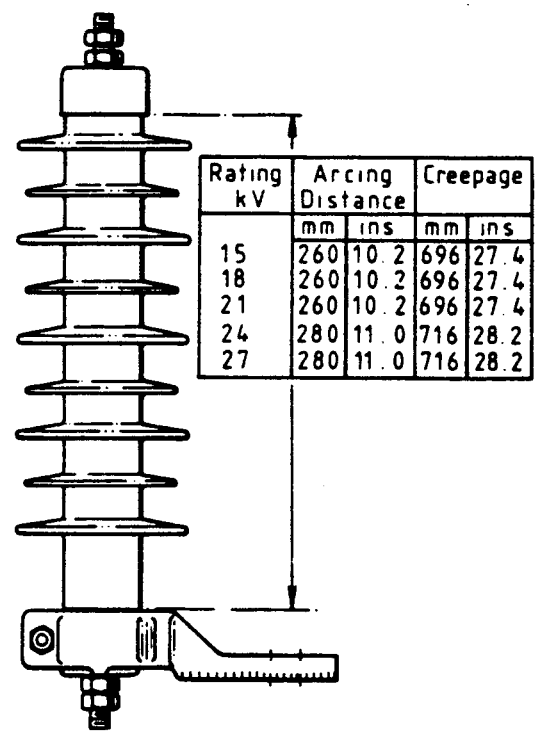
Figure 3:
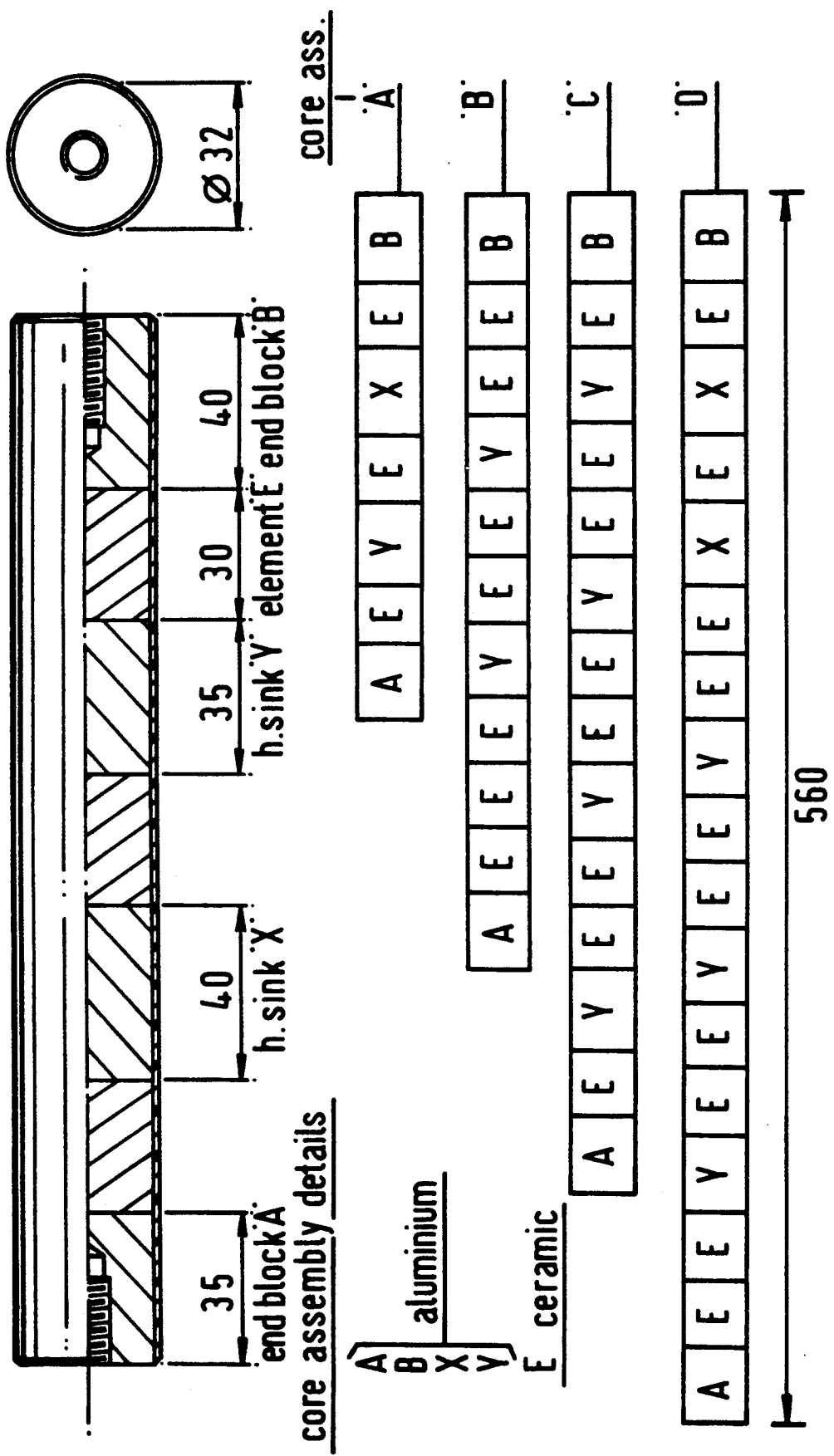
FIG. 3 is a chart showing the internal constructional arrangement of the arresters shown in FIG. 2.

FIG. 2 illustrates how a range of differently sized and differently rated distribution class surge arresters can be constructed in accordance with the principles of FIG. 1 simply by varying the number and the distribution of the varistor blocks 2 and aluminum heat sink/spacer blocks 3 so as to vary the length of the arrester. The four surge arresters shown in FIG. 2 are designated as types EA, EB, EC and ED and their kV ratings, arcing (between end caps) distances, and creepage distances are given in FIG. 2 as typical values. FIG. 3 is a chart illustrating the arrangement of the constituent blocks in the different surge arrester configurations of FIG. 2 and, as will be seen, all four surge arresters are made up of first and second end blocks A and B formed as aluminum alloy cylinders of 32 mm diameter and 35 mm and 40 mm length respectively, heat sink/spacers X and Y formed as aluminum alloy cylinders of 32 mm diameter and 40 mm and 35 mm axial length, respectively, and varistor blocks E in the form of cylinders of 32 mm diameter and 30 mm axial length, the different length arresters being made up of different combinations of these basic elements with the varistor blocks distributed through the length of the respective arresters for voltage grading purposes. It will be appreciated that the dimensions of the parts as represented in FIGS. 2 and 3 are exemplary only and are susceptible of variation.

As compared to an equivalent conventional porcelain housed surge arrester, a surge arrester constructed in accordance with the teachings of FIGS. 1 to 3 has the significant advantage of displaying a nonexplosive failure mode and affords yet further advantages in that it is light weight, weighing only about half as much as a conventional arrester, and yet is very strong and robust, resistant to damage through vandalism and improper handling, and unaffected by atmospheric pollutants and impervious to moisture ingress. It has only recently been appreciated that some previously unexplained failures of conventional surge arresters could have resulted (and most probably did result) from the effects of ionization within the arrester producing a reducing atmosphere which increases the electrical conductivity of the varistor elements. These effects are exacerbated by the presence of moisture within the arrester, and by external atmospheric pollution which tends to increase the internal electrical stressing of the varistor elements. By avoiding the entrapment of gas or moisture within a surge arrester, the present invention completely obviates these problems of conventional surge arresters. Moreover, the surge arrester of the present invention can be manufactured at lower cost than a conventional surge arrester. Given these advantages and given that polymeric heat shrink materials have been utilized in high voltage applications, particularly in cable terminations, for upwards of twenty years, and that varistor blocks of the type employed in the inventive surge arrester were initially developed in excess of fifteen years ago and have seen extensive application in surge arresters, it may be thought surprising and significant that nobody has previously proposed such a construction.

It will have been noted that the aluminum blocks 3 have been referred to in the foregoing as heat sinks/spacers. This is because the blocks 3 do in fact perform two essential functions. Firstly, they serve as heat sinks within the arrester which operate to safeguard the structural integrity of the arrester core by provision of substantial thermal sinks at the faces of the varistor blocks 2, and secondly they serve to elongate the arrester so as to achieve the required arcing distance. In similar fashion, the glass reinforced plastic shell 5 serves the dual functions of providing for the structural integrity of the arrester core assembly and also serving as a thermal barrier. As will be appreciated by those skilled in the art, in the short-circuit failure mode of the arrester (and statistically every arrester is unavoidably liable to fail in this potentially most hazardous mode) which would last only for a fraction of a second until a circuit breaker trips in the associated power system, a very high transient current would flow through the arrester with the generation in consequence of temperatures of the order of 2000° C. within the arrester core; the glass reinforced plastic shell serves to protect the polymeric outer housing of the arrester from this transient temperature extreme, thereby ensuring the structural integrity of the arrester throughout and after the duration of the transient. A conventional porcelain-housed arrester would most likely shatter explosively as a result of such a transient condition.

In the manufacture of surge arresters in accordance with the present invention, the essential prerequisites are that voids and air entrapment must be avoided, and that bleed of fluid plastics materials between the contiguous faces of the varistor blocks and the adjoining terminal and heat sink/spacer blocks must also be avoided. With these requirements, the practice of the invention requires that ceramic varistor valve blocks, aluminum heat sinks/spacers and aluminum end blocks be retained in face contact with each other by encasing in a glass fiber reinforced epoxy shell, and basically there are two alternative methods of achieving this. In accordance with one method, the arrester core blocks can be inserted into a pre-formed and pre-cured glass fiber reinforced epoxy tube, subjected to axial compression within the tube, and epoxy adhesive injected into the tube under vacuum and cured. In accordance with a second method, the assembled and axially compressed core components are over-wrapped with a glass fiber reinforced epoxy pre-preg and curing is then effected. While both of these methods are theoretically feasible, the second-mentioned method is presently preferred on account of difficulties experienced in practice of the first method in preventing ingress of epoxy material between the faces of the assembled component blocks, though any difficulties in this regard could be obviated by sealing the interstices of the assembled component blocks using an electrically conductive material, such as a silver loaded epoxy resin, for example.

In the performance of the second method above-mentioned for forming the core assembly, and as will be more fully described hereinafter, the following main production stages are involved, as indicated in the process flow chart of FIG. 4:

1. Core preparation;
2. Wrapping core with pre-preg; and
3. Curing and molding.

Taking the arrangement of FIG. 1 for illustration and with an arrester type designation EA as per FIGS. 2 and 3, the core assembly consists of five different components:

1. ceramic varistor elements 'E' 30 mm long;
2. heat sink 'X' 40 mm long;
3. heat sink 'Y' 35 mm long;
4. end block 'A' 35 mm long: and
5. end block 'B' 40 mm long.

Each of the four basic assembly lengths for arrester types EA, EB, EC and ED involves different combinations of the above components. Correct assembly configuration is critical to the operation of the surge arrester, wherefore the cores are desirably preassembled as a separate operation. The components are thoroughly degreased and cleaned and are then assembled in the required order into a retaining tray or jig, where they are held under axial compression, with no further handling necessary after this stage prior to wrapping. This enables the core assemblies to be individually inspected for correct configuration, incorrect assemblies being easily rectified at this stage. The cores should not be removed from the tray until the wrapping stage. If desired, a small amount of a conductive adhesive such as a silver-loaded epoxy resin, for example, can be introduced between the adjoining faces of the varistor, heat sink and end blocks for the purpose principally of sealing the interstices between such adjoining surfaces against intrusions during subsequent manufacturing operations.

Before overwrapping with pre-preg, the cores must be pre-heated. This is essential as, during the wrapping process, the pre-preg must be raised to its softening temperature to enable some resin flow to take place, which allows the pre-preg to conform to the shape of the core, encourages shell-to-core bonding, prevents air entrapment and consolidates the separate plies. Also, if an electrically conductive resin is utilized as an interstitial seal between the component blocks, the preheating will serve to cure the resin. Pre-heating can be simply accomplished by placing the tray of cores into an air circulating type oven and allowing the cores to stabilize at the required temperature. This temperature is dependant on the resin formulation but is typically of the order of 50° to 70° C. After heating, the tray of cores can be transferred to the wrapping stage without disturbance. The mass of the solid core elements should prevent too much heat loss prior to overwrapping.

Figures 1, 5:
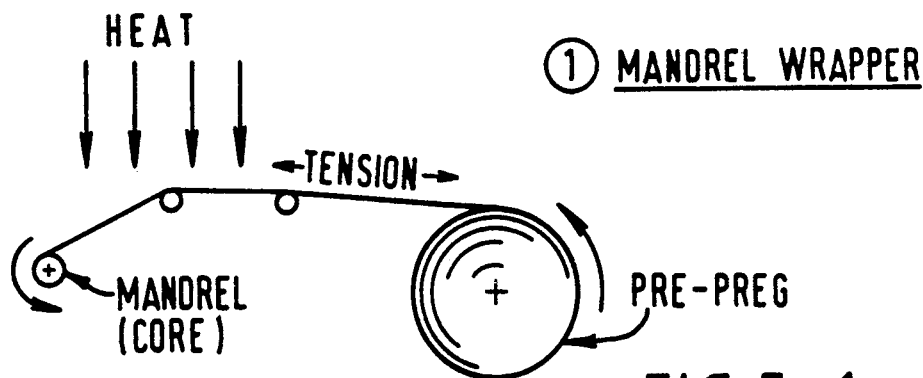
Figures 2, 5:
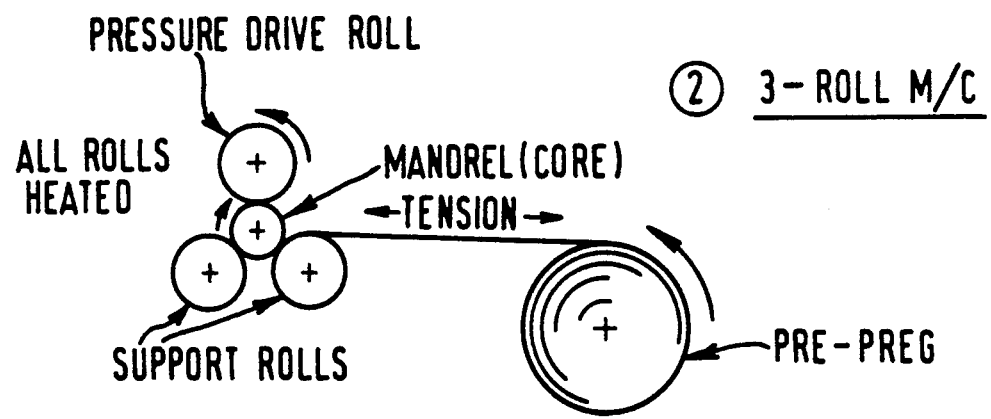
Figures 3, 5:
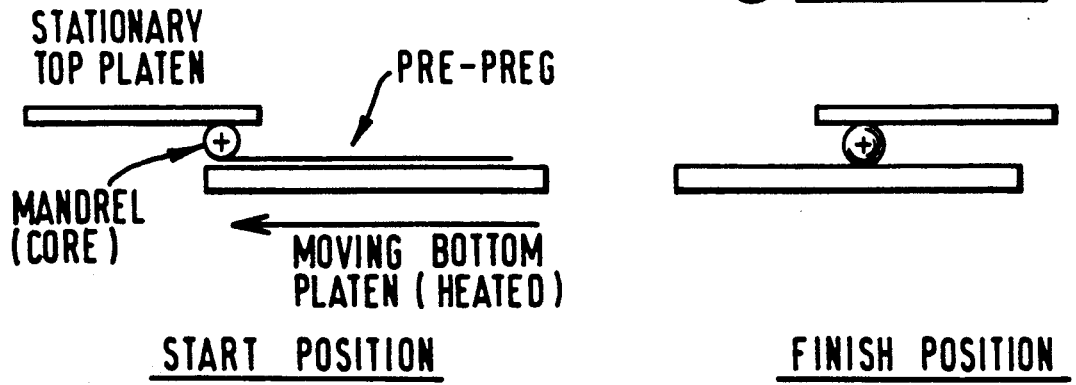

Having assembled the core components in the desired combination and component distribution, the wrapping of the core components can be achieved by means of two basic techniques, namely:

1. Winding (a) The simplest technique is schematically illustrated in FIG. 5-1 and is to rotatably support the core components between centers and overwrap with pre-preg directly from a roll under tension, heat being applied by infra-red heaters or hot air blowers. Wrapping is accomplished by rotating the core until the required number of wraps have been applied. This technique is most suitable for use with small length core assemblies which would resist breaking up under the tension of the pre-preg, and if used for longer lengths would necessitate use of support rollers.

(b) A second winding technique is schematically illustrated in FIG. 5-2 and uses a three roll type machine. The core is allowed to rest on two support rollers with a third driving roller rotating the core and providing high consolidation pressure. Pre-preg is fed into the rollers and picked up by the pre-heated core. As above, rotation is continued until the required number of wraps is complete. Pre-preg is again fed off the roll under tension. This technique provides good support to the core assembly with the addition of some axial pressure but tends to squeeze resin out of the pre-preg due to the high roller pressure needed to rotate the core. Machines of this type can also cause difficulties in tacking the pre-preg onto the core.

2. Rolling

In this process, schematically illustrated in FIG. 5-3, the pre-preg is in the form of a cut blank which is laid flat onto a heated platen. The pre-heated core is placed onto the front edge of the blank and simply rolled across the platen to wind on the pre-preg. Consolidation may, if required, be achieved by the use of second platen above the first, one platen remaining stationary while the other moves laterally to wrap the core, though, since as hereinafter described a molding process using pressure is utilized during curing, consolidation at the wrapping stage need be only minimal or can be omitted altogether.

Both the winding processes above-mentioned have the disadvantage that pre-preg is taken off a roll, the axis of which is parallel to the tube axis: i.e., the length of shell produced is dependent on the width of the roll. Different lengths of core assemblies would require different roll widths and hence larger stocks of raw material. As compared to the winding processes, the rolling process has the advantage that the pre-preg is used in the form of a blank. Since the arrester cores are required to have a substantially constant shell thickness of, say, six wraps, one dimension of the pre-preg blank remains constant, thus enabling the roll of pre-preg to be of constant width, simply slitting the required length off to suit the core assembly. Only one roll size is therefore needed, leading to reduced stock levels and removing the need to change rolls on the machine for different core assemblies. Other advantages arising from the rolling technique are that the pre-preg blank is heated evenly on the platen, thereby so preventing or at least minimizing creasing and improving initial softening of the material to roll the shell. The pre-preg blank is not under tension, therefore axial pressure only is sufficient to retain the cores, a simple guide roller above the core being sufficient to prevent any flexing due to misalignment of the core elements, and the mechanical design of the rolling machine is simplified with a single heated platen instead of rollers or heater banks, a straightforward drive arrangement, and no tensioning device needed for pre-preg let-off. The process furthermore is versatile in that different lengths and diameters of core assemblies can be produced.

Figure 4:
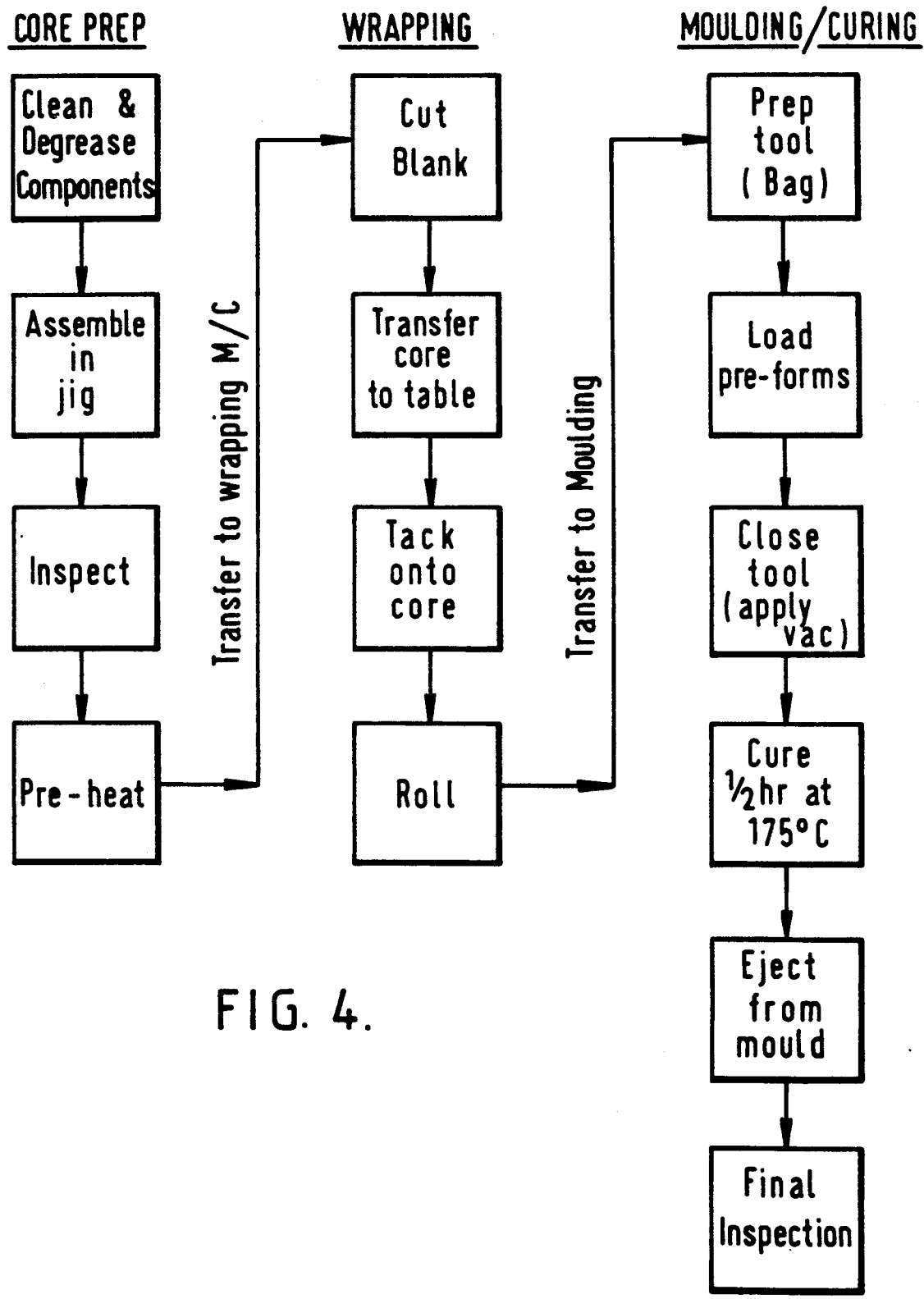
FIG. 4 is a flow diagram illustrating the various stages involved in the manufacture of an exemplary surge arrester according to the present invention.
Figure 6:
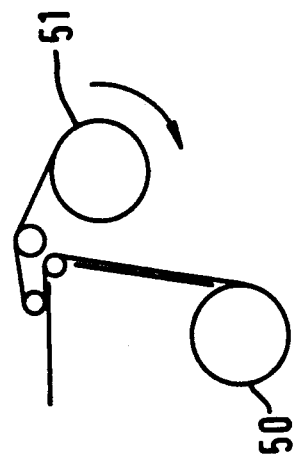
Figures 4, 6:
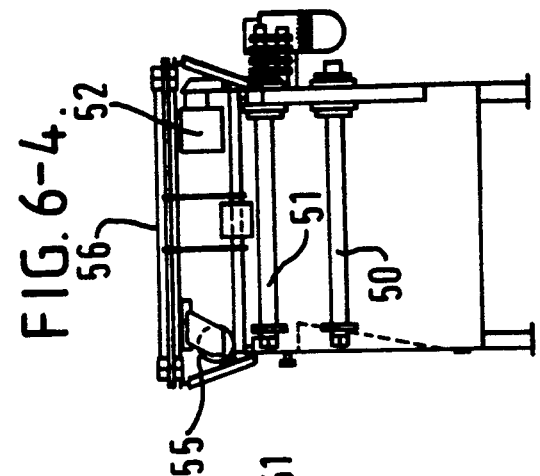
Figures 1, 6:
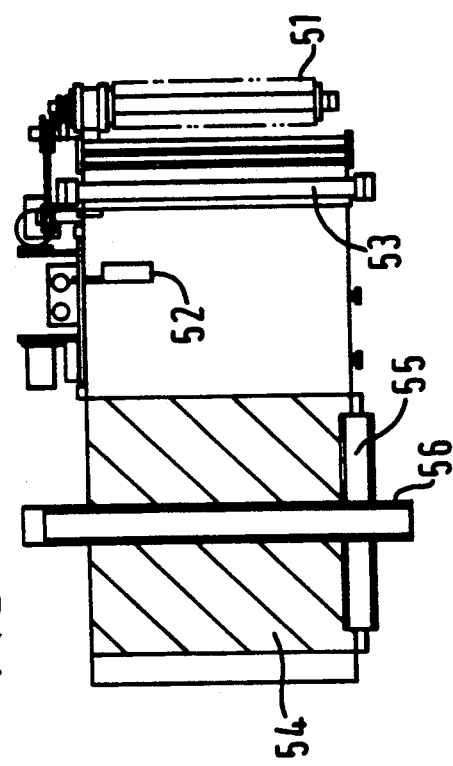
Figures 2, 6:
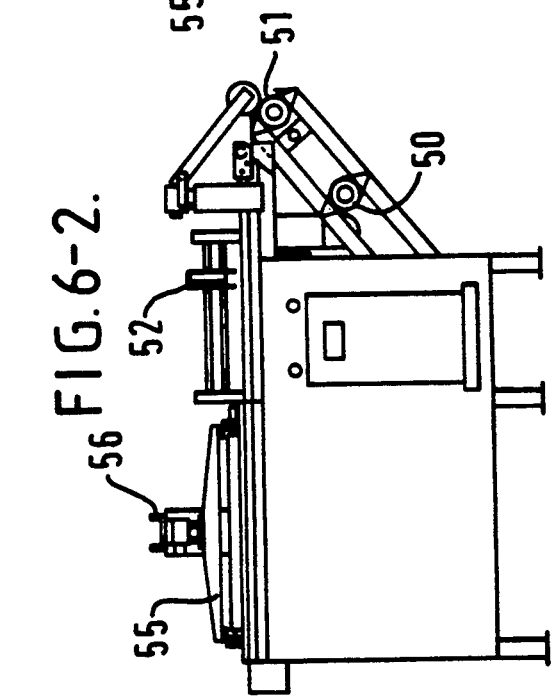
Figures 5, 6:
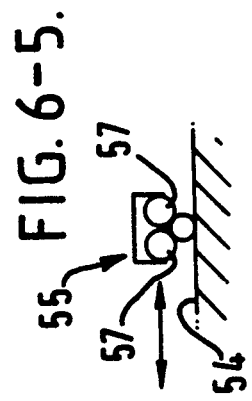
Figures 3, 6:
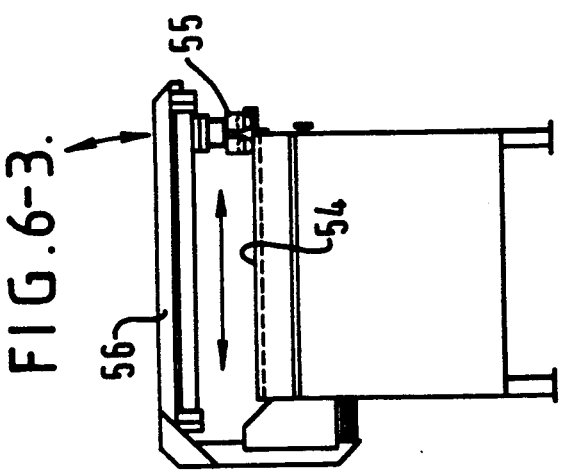

FIGS. 6—1 through 6—6 show an exemplary form of rolling machine which we have designed and constructed for the purpose of enwrapping the arrester cores with a pre-preg blank, FIG. 6-1 showing a top plan view of the machine, FIG. 6-2 a front elevation view, FIGS. 6-3 and 6-4 respective end elevation views, FIG. 6-5 a scrap view illustrating how the core assembly is supported by means of rollers during the wrapping, and FIG. 6—6 a further scrap view illustrating the pre-preg feed arrangement.

Briefly stated, the machine of FIGS. 6—1 to 6—6 is used as explained hereinafter. Pre-preg material in the form of a resin impregnated fibrous mat rolled up with a non-stick release sheet is provided on a feed roll 50 and, as is shown clearly in FIG. 6—6, peeled and pulled off the feed roll 50 by means of an electrically driven drive roll 51 which winds on the release sheet, thereby stripping the release sheet from the pre-preg and at the same time advancing the pre-preg on to the working table of the illustrated machine. The amount of pre-preg that is fed onto the working table of the machine is determined by the adjustable positional setting of a photoelectric sensor 52 which detects the front edge of the advancing pre-preg web and in response thereto halts the advance of the pre-preg web and activates a crush cutter 53 which severs the web widthwise of the working table, thereby separating a rectangular blank of pre-preg material of precisely determined size from the pre-preg supply. Thereafter the pre-preg blank is transferred, either manually or automatically, to a temperature-controlled heated rolling platen 54 of the machine which has a non-stick coating of PTFE, for example, and the pre-heated core assembly which is to be wrapped is tacked onto the pre-preg blank at one end thereof, taking advantage of the natural tackiness of the pre-preg material and is then engaged with the rolling head 55.

The rolling head 55 is mounted on a cantilevered arm 56 which can be pivoted upwardly, as shown in FIG. 6-3, to enable the arrester core to be engaged with the rolling head in the manner schematically shown in FIG. 6-5, with the arrester core received between a pair of support rollers 57 and positively located by the rollers 57 on the platen 54. The rolling head 55 is mounted on the arm 56 so as to be movable across the platen 54 for rolling the pre-cut pre-preg blank onto the arrester core, such movement preferably being automatically effected under operator supervision so as to ensure that the pre-preg is taken up uniformly onto the arrester core. The cantilevered arm 56 is pivotally movable in a vertical plane for loading and unloading of arrester cores, and desirably is arranged to provide a controlled rolling pressure such that the pre-preg wrapping on the arrester core is to a controllable degree consolidated during rolling. The rolling head 55 is arranged to return the arrester core with its pre-preg wrapping to the front of the machine, which also assists the consolidation of the pre-preg material. The pre-preg wrapped arrester cores are then unloaded from the machine, either automatically or manually.

The rolling machine thus described is automatically controlled throughout its operations of stripping the backing sheet off the pre-preg and advancing the pre-preg to the cutter, arresting the advance of the pre-preg in dependence upon the set position of the photoelectric sensor so as to determine the width of the pre-preg blank that is cut from the roll, severing the advanced portion of the pre-preg roll by means of the crush cutter so as to define the blank, and rolling the pre-preg blank onto the arrester core where the temperature of the heated platen is controlled in addition to the actual rolling (length of roll stroke), and consolidation pressure being controlled. In an actual embodiment of the machine that we have constructed, the stripping of the backing sheet and advance of the pre-preg is controlled by suitable control of the electric motor driving the take-up roller 51 and appropriate gearing between the take-up roller 51 and the supply roll 50, to ensure that the pre-preg is delivered to the machine at a constant speed and the backing sheet is taken up under substantially constant tension. The crush cutter 53 is pneumatically operated under control of the photosensor 52 for forward and return strokes, and a pneumatic drive arrangement for the rolling head 55 is also utilized. The rolling platen 54 is uniformly heated by means of a series of flat electric heating elements located beneath the platen and controlled to obtain a platen temperature which is just high enough to soften the epoxy resin in the pre-preg blank without making the same excessively fluid or sticky. The platen temperature can conveniently be adjusted to suit the particular pre-preg material utilized.

Other features of the machine as illustrated in FIGS. 6—1 to 6—6 form no part of the present invention and will not be described further herein, the description given hereinabove in conjunction with the description given of the inventive surge arrester and its method of fabrication clearly being sufficient to enable the invention in all of its aspects to be put into effect.

As regards the specification of the pre-preg materials, the following considerations apply. The pre-preg is conveniently a glass fabric reinforced epoxy material utilizing an epoxy resin having good bonding properties and with a cure cycle which is short and straightforward without staging or intermediate temperature dwell periods. The materials should be readily available, and preferably commercial standards, and desirably should have a long shelf life to obviate the need for refrigerated storage. The pre-preg should be easily handled, easily formed and without excess tack, and desirably the softening temperature of the resin should be about 50° C. and preferably around 30° to 40° C. Finally, an electrical grade resin should be used with good insulation properties.

An exemplary pre-preg material which satisfies these considerations utilizes a glass fiber fabric having a 7628 weave style which molds as a pre-preg to 0.008" thick. This is a fine plain weave fabric and is a standard weave style commonly used for electrical laminate reinforcement, and is readily available in the U.K. and the U.S.A. Fabric construction is 42 ends warp×32 picks weft using 75-1/0 yarn. The main parameters for selecting the resin are its performance, cost, processing characteristics and availability. Resin content, flow, softening temperature, degree of tack and even cure cycle can be altered if need be to suit variations in the process. The constituents of one suitable resin system are manufactured by Ciba Geigy and are readily available. The system in question is a brominated Bisphenol-A epoxy using Dicyandiamide (Dicy) as the curing agent. Liquid unmodified Bisphenol-A may be added to the formulation to bring the softening point down. The system is flame retardant and meets NEMA grade FR-4. It is conventionally used to manufacture high quality electrical laminates, particularly printed circuit boards. The resin system comprises:

| Resin | Ciba XD4153 Brominated epoxy |
|---|---|
| Hardener | Ciba X83/520 Dicy |
| Modifier | Ciba MY750 Bisphenol-A |
| Cure Cycle | ½ Hr @ 170/180° C. |
| Softening point | 45/50° C. |
| Resin content | 45% ± 1% by weight |

Having wrapped the arrester core assembly with the pre-preg material, the next step is the molding and simultaneous curing of the epoxy resin. The curing process involves raising the pre-formed core assembly to an elevated temperature and maintaining it for a period of time, the time and temperature being governed by the formulation of the resin system. Pressure is applied during the cure cycle so as to form the resin and encourage the resin to flow throughout the fabric plies and into intimate contact with the underlying core, though not between the contiguous faces of the blocks, on account of the relatively high viscosity of the resin and the close fitting nature of the face-to-face block contacts, and/or the provision of an electrically conductive sealing compound between the faces of the blocks. On full cure, the resin is a hard homogeneous solid. The curing process can most satisfactorily be accomplished by heating the core in a mold and for production of substantial quantities of arresters specially designed dedicated tooling is required. The use, of a mold allows higher molding pressures to be used with subsequent improvements in molding quality and properties, and the manufacturing process becomes less susceptible to variations in pre-preg quality and requires less operator skill. In addition, the wrapping process is simplified, as good consolidation of the pre-form is not necessary, molding pressure giving good resin flow and removal of voids, particularly if the mold is simultaneously evacuated.

Various methods of mold curing the pre-preg wrapped core assembly are available. Some of the factors influencing mold design are the production rate, the cure cycle, the molding pressure required, the variations in component length and diameter to be accommodated, and the capital cost. At a production rate of, say, 15 components per hour and a cure cycle of, say, ½ hour at 170° C., an eight-cavity tool would be required. This tool would be approximately 600 mm long×400 mm wide and the cavities would require soft (e.g., silicone rubber) lining to allow for variations in diameter of the ceramic elements. A molding pressure of 15 to 20 p.s.i. would require a tool closing force of approximately 4 tons. A press of sufficient platen area to accommodate the tool, and with heated platens, would be prohibitively expensive and would be vastly over-rated on available ram pressure. A heated tool supported by a fabricated framework and pressured by a simple hydraulic jack could be manufactured specifically for the process at significantly lower capital cost. It would also occupy less floor space than a commercial press and would probably be more economical to run.

Figures 1, 7:
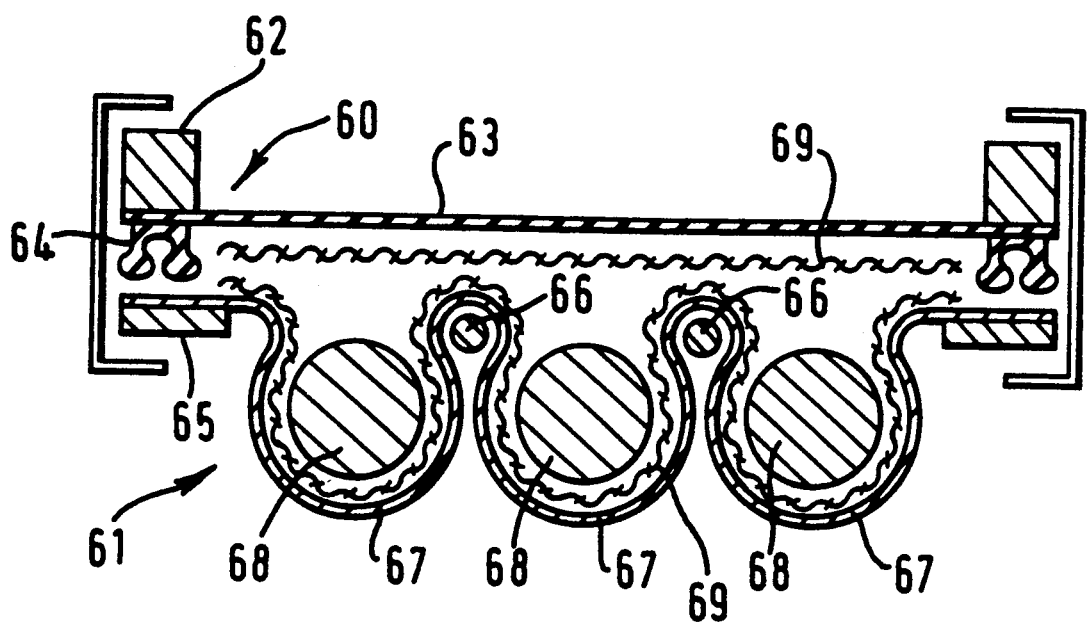
Figures 2, 7:
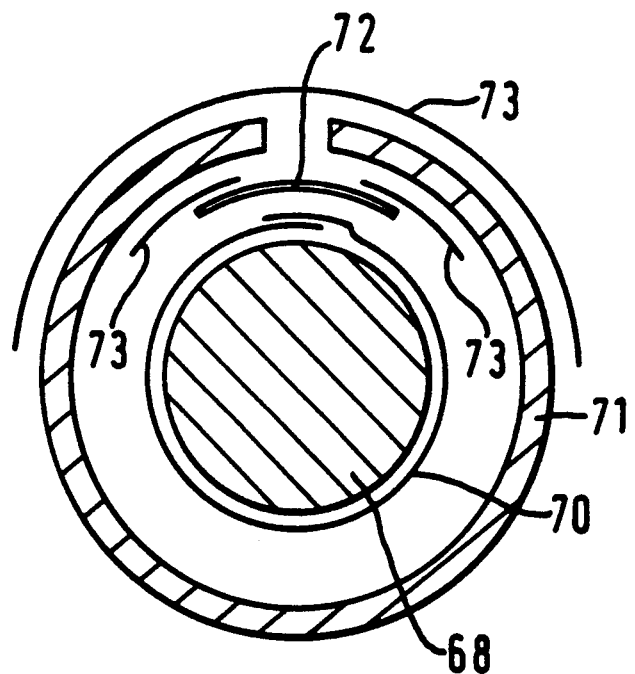

An alternative and more practical closed mold technique is illustrated in FIGS. 7-1 and 7-2 and uses a vacuum bag. This is effectively a flexible mold with a frame to retain the components. On application of vacuum, the bag seals around the edges and forms to the shape of the component, applying pressure evenly to all surfaces. Curing is accomplished by heating in an air circulating oven or, better still, in an autoclave (with the advantage that additional external pressure can be applied). Air entrapment is prevented by the application of vacuum throughout the cure cycle. This technique has a low capital cost for tooling especially if an oven and vacuum pumping equipment is already available. Production rates are not as high as for matched metal molds as the heat transfer rates are slower. However, additional molding bags (i.e., extra tool cavities) can be added at very low cost.

Referring more particularly to FIG. 7-1, the exemplary vacuum bag assembly schematically illustrated therein in transverse cross-section, and exemplarily showing provision for curing of only three surge arrester assemblies in side-by-side relationship (through in practice many more assemblies would be accommodated), comprises an upper portion 60 and a lower portion 61 adapted to seat together as shown and to seal together for the evacuation of the chamber thus defined therebetween. The upper portion 60 comprises a rectangular open frame 62 having a silicone rubber membrane 63 secured thereto in an airtight manner and provided with a sealing strip 64 for sealing to the lower portion. The lower portion 61 comprises a similar frame 65 from which there is supported a lattice of support rods 66 which serve to define, as shown, a series of depending folds 67 in a silicone rubber membrane sealed to the frame 65. Surge arrester core assemblies 68 are schematically shown within the folds 67, and it will be appreciated that, when the two portions of the vacuum bag assembly as illustrated are brought together and the intervening space evacuated, the silicone rubber membranes 63 and 67 collapse around the core assemblies 68 so as to exert a molding pressure upon the same, which is intensified if the vacuum bag assembly is introduced into a pressurized atmosphere, as in an autoclave, for instance. The silicone rubber membranes 63 and 67 are, as shown in FIG. 7-1, lined with disposable air-permeable breather ply 69 to facilitate the evacuation of the air space therebetween.

To ensure that the pre-preg wrapped surge arrester core assemblies 68 do not adhere to the breather ply 69 or to the silicone rubber membranes 63 and 67, the core assemblies coming off the rolling machine hereinbefore described are first carefully wrapped with a release film or peel ply to which the epoxy is non-adherent. Then, to avoid the formation of creases or wrinkles in the cured resin, the peel ply wrapped core assembles are each inserted into a longitudinally split silicone rubber tube of internal diameter substantially equal to the required external diameter of the finished core assemblies, the split in the silicone rubber tube being sealed as, for example, by means of a metal shim or the like, to ensure that the arrester core surface after molding does not have a molding defect corresponding to the split in the silicone rubber tube. Referring to FIG. 7-2, the core assembly 68 as it comes from the pre-preg rolling machine is shown wrapped in a release film layer 70, which in turn is embraced by the split silicone rubber tube 71 with a shim 72 underlying the split in the tube. Reference numerals 73 designate temperature-resistant adhesive tape used for securing the various layers in position about the pre-preg enwrapped core assembly 68.

By molding and curing the pre-preg enwrapped arrester core, as hereinbefore described, it is ensured that the epoxy resin in the pre-preg is uniformly consolidated about the arrester core without any voids or air entrapments, and furthermore the cured epoxy resin has a very smooth surface upon which the external elastomeric or heat-shrink external housing of the finished arrester can readily seat without formation of voids or air entrapments, as is of paramount importance in the practice of the present invention if superlative surge arrester qualities are to be ensured.

Having formed the arrester core as hereinbefore described, the assembly of the heat shrink sleeve and the end caps and terminals to the core is a simple matter. The core assembly is inspected for any resin bleed onto the end faces of the end blocks of the core, and, if any such resin bleed has occurred, it is cleaned off, by grinding, for example. The core assembly may then be cleaned and degreased, if necessary, and assembled with the end caps and terminal components and with the heat shrink sleeve in a simple jig. The sealant for the interface between the heat shrink sleeve and the core may be pre-coated on the inside of the heat shrink sleeve or may be coated onto the core, and the sealant for the end caps can be loaded into the end caps by the operator. Having thus assembled the components, the jig with the assembled components is inserted into an evacuable oven chamber where the assembly is subjected to heat, from radiant infra-red heaters for example, so as to cause the heat-shrink material to shrink down onto the arrester core, with any air entrapment being avoided by virtue of the evacuation of the chamber and voids being avoided by virtue of plastic flow of the sealant. The heating and air evacuation similarly cures the sealant in the end caps and ensures that no voids are left therein.

Figures 1, 8:
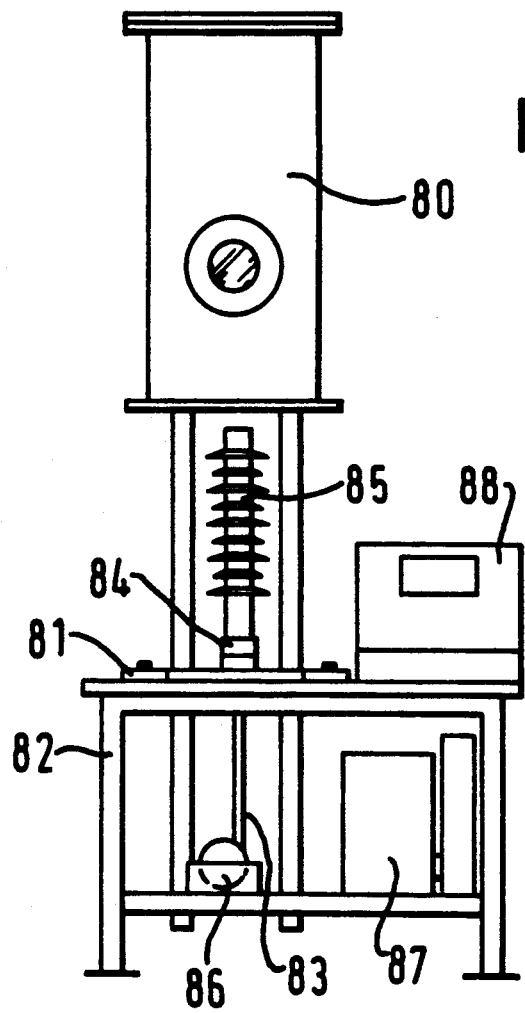
Figures 2, 8:
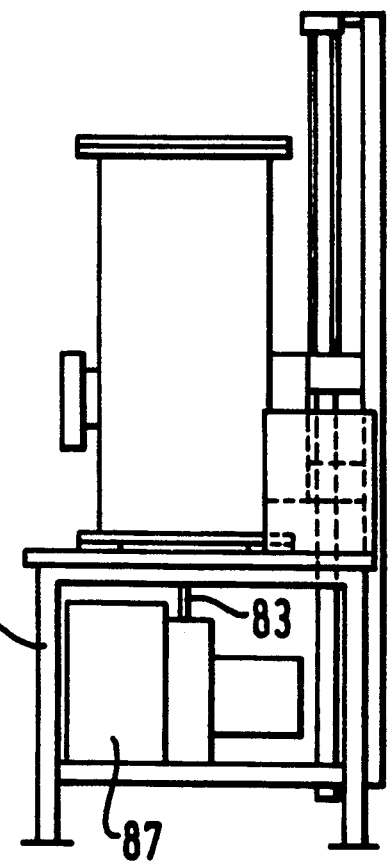

FIGS. 8-1 and 8-2 illustrate, in front and side elevation views, respectively, an exemplary vacuum oven which we have designed for use in the final heat-shrinking of the surge arrester heat-shrink material external housings onto the surge arrester cores as preformed, as hereinbefore described. The vacuum chamber of the illustrated apparatus is defined by a cylindrical pressure bell 80 which is open at its lower end and which is mounted on vertical guide tracks to be vertically movable relative to a sealing plate 81 provided on the surface of a work-table 82. The sealing plate 81 is provided with an O-ring seal or the like for co-operating with the lower edge of the pressure bell 80 when the same is in its lowered position, as shown in FIG. 8-2, so as to define a sealed evacuable work chamber. A rotary shaft 83 extends vertically through the center of the sealing plate 81, with pressure sealing means provided between the surface of the shaft and the plate, and carries at its upper end a receptor 84 adapted to receive therein one end of a surge arrester 85 to be treated in the apparatus. The lower end of the shaft 83 is coupled to a drive motor 86. One or more infra-red radiant heaters are provided within the pressure bell 80, and the arrangement of the rotary receptor 84 with its drive shaft 83 and motor 86 is to rotate the surge arrester 85 relative to the radiant heater(s) so as to ensure that the heat-shrink sleeve of the arrester is uniformly heated. Reference numeral 87 designates a vacuum pump for evacuating the vacuum oven, and reference numeral 88 designates a control module incorporating pressure and temperature monitoring and control equipment and sequence control equipment for monitoring and controlling the overall operation of the oven.

While the oven illustrated in FIGS. 8-1 and 8-2 has provision for only one surge arrester to be treated at a time, it will be appreciated that, for volume throughput, a plurality of rotary receptors would be provided in the sealing plate 81, so that a plurality of arresters could be treated at the same time. As shown, an inspection window is provided in the cylindrical wall of the pressure bell 80.

Figure 9:
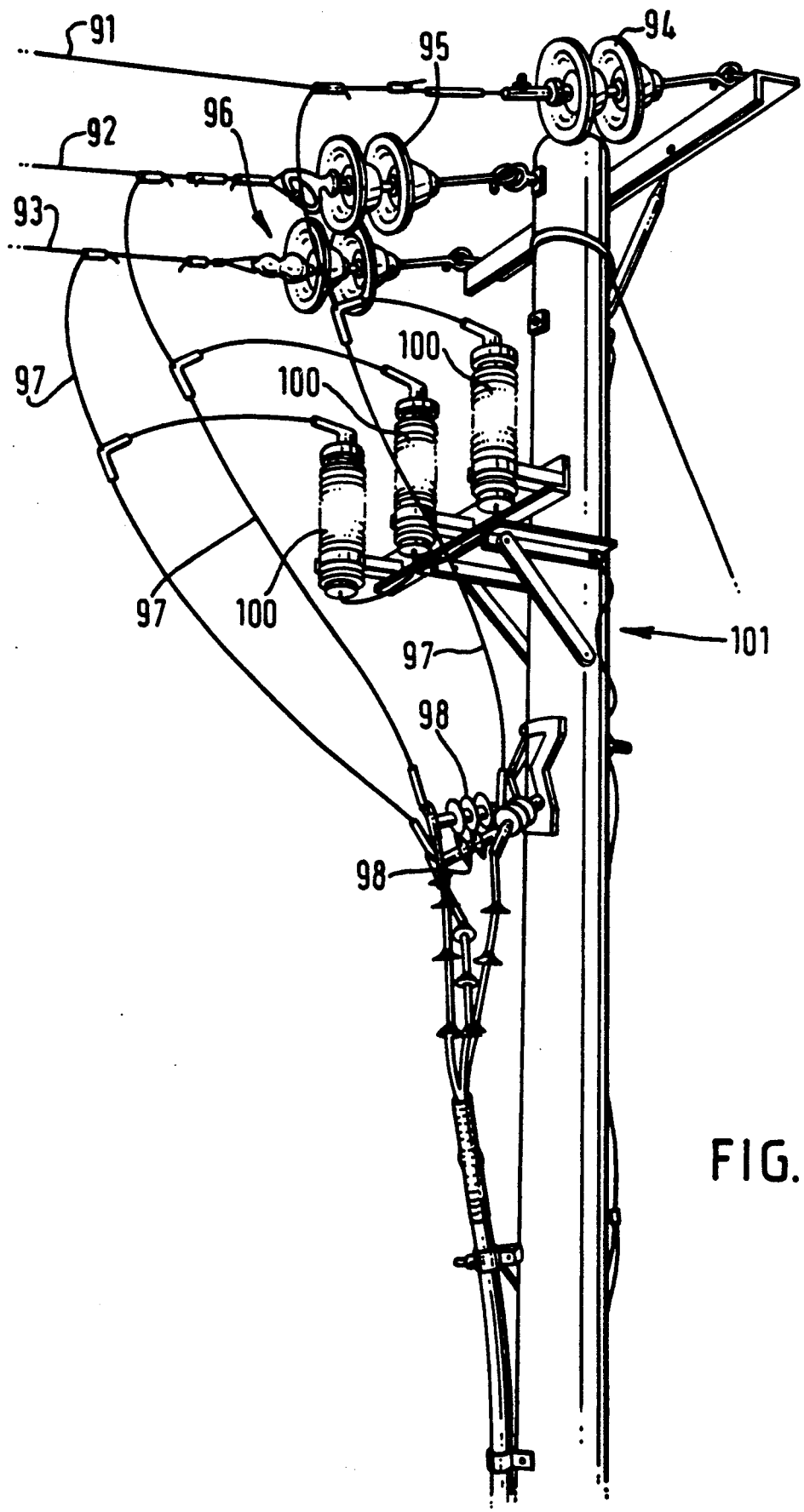
FIG. 9 shows a conventional electric power distribution pole with associated surge arresters and support insulators which can be advantageously modified in accordance with the teachings of the present invention.

Referring now to FIG. 9, there is shown therein a conventionally dressed power distribution pole for interconnecting overhead three-phase power lines to the end of an underground power cable. The figure shows three overhead power lines 91, 92 and 93 supported from a cross arm attached to the pole by means of insulating ties 94, 95 and 96. Connected to each of the power lines 91, 92, 93 is one end of a respective connecting lead 97 the other end of which is supported by means of a respective one of three stand-off support insulators 98 and connected to a respective core or cable 99. Three conventional porcelain-housed surge arresters 100 are supported on a mounting bracket 101 attached to the power distribution pole, and each surge arrester 100 is electrically connected between ground and a respective one of the connecting leads 97. As will be well appreciated by those skilled in the relevant arts, the arrangement illustrated is costly in components and also requires a substantial amount of time to fabricate. In view of the fact that surge arresters in accordance with the present invention have very considerable physical strength, the possibility arises of utilizing such surge arresters in place of the standoff support insulators 98, in which case the surge arresters 100, their associated mounting bracket 101, and their associated wiring connections can be dispensed with. Thus, not only are the surge arresters of the invention cost advantageous in themselves, but they also enable other conventionally required components to be dispensed with, which not only is aesthetically and environmentally more acceptable but also enables the time required for fabrication of such a system, as shown in FIG. 9, to be significantly reduced.

Having thus described the physical construction of surge arresters in accordance with the invention, apparatuses, methods and materials for their manufacture, and an advantageous exemplary application thereof, it is to be appreciated that variations and modifications, for example the use of a mechanically released elastomeric material instead of the heat-shrink material herein particularly described, could be made without departure from the essence of the invention, which is to encase a rigid solid-state arrester core comprising varistor blocks sealingly and without voids or gaseous entrapments within an outer housing of polymeric heat-shrink material or mechanically-released elastomeric material with a heat shield of dielectric material between the core and the outer housing to preserve the integrity of the outer housing against high temperature transients arising under short-circuit failure conditions.

We claim:

1. A method of manufacturing a surge arrester comprising the steps of
   (a) assembling terminal blocks, varister blocks and electrically conductive heat sink/spacer blocks in face-to-face contact in a distributed array;
   (b) applying forces to said terminal blocks so as to compress together all of the blocks in said array;
   (c) while maintaining said blocks in said array, enwrapping said array of blocks with a pre-preg material of a reinforced rigid plastic material;
   (d) curing said plastic material in said pre-preg under mold pressure and evacuation so as to bring said plastic material into intimate bond contact with said blocks free of gaseous entrapments and voids and to encase said blocks within a rigid shell bonded to peripheral surfaces of said block, thereby forming a core of encased blocks;
   (e) introducing said core within a shedded sleeve of polymeric heat-shrink material with a fluid weather-proof sealant therebetween; and
   (f) applying heat to shrink said sleeve of heat-shrink material onto said core in an evacuated chamber so as to avoid gaseous entrapments and voids between said core and said shrunk sleeve.

2. A method according to claim 1, including maintaining said blocks in said array by means of electrically conductive adhesive.

3. A method according to claim 1, wherein enwrapping of said array of blocks with said pre-preg material is effected by laying a pre-preg blank of suitable size upon a heated table and rolling said array of blocks along said table so that said pre-preg is picked up by said array and wrapped thereon.

4. A method according to claim 3, including consolidating the enwrapped array of blocks by compressing them between said table and an upper table during the rolling operation.

5. A method according to any one of claims 1 to 3, wherein the curing of said plastic material under mold pressure and evacuation is effected using a mold comprised of flexible mold layers adapted to be compressed into contact with a pre-preg enwrapped arrester core assembly therebetween by application of external pressure and evacuation of an internal void between said mold layers.

6. A method according to any one of claims 1 to 3, wherein said reinforced rigid plastic material comprises a woven glass fiber fabric impregnated with uncured epoxy resin.

7. A method according to claim 6 wherein said epoxy resin comprises a Brominated Bisphenol-A epoxy using Dicyandiamide curing agent.

8. A method of manufacturing a surge arrester comprising the steps of
   (a) assembling terminal blocks, varister blocks and electrically conductive heat sink/spacer blocks in face-to-face contact in a distributed array;
   (b) applying forces to said terminal blocks so as to compress together all of the blocks in said array;
   (c) while maintaining said blocks in said array, enwrapaping said array of blocks with a pre-preg material of a reinforced rigid plastic material;
   (d) curing said plastic material in said pre-preg under mold pressure and evacuation so as to bring said plastic material into intimate bond contact with said blocks free of gaseous entrapments and voids and to encase said blocks within a rigid shell bonded to peripheral surfaces of said blocks, thereby forming a core of encased blocks; and, (e) introducing said core within a shedded sleeve of mechanically released elastomeric material with a fluid weather-proof sealant therebetween.

9. A method of manufacturing a surge arrester comprising the steps of
   (a) assembling terminal blocks and varistor blocks in face-to-face contact in a distributed array;
   (b) applying forces to said terminal blocks so as to compress together all of the blocks in said array;
   (c) while maintaining said blocks in said array, enwrapping said array of blocks with a pre-preg material of a reinforced rigid plastic material;
   (d) curing said plastic material in said pre-preg under mold pressure and evacuation so as to bring said plastic material into intimate bond contact with said blocks free of gaseous entrapments and voids and to encase said blocks within a rigid shell bonded to peripheral surfaces of said block, thereby forming a core of encased blocks;
   (e) introducing said core within a shedded sleeve of polymeric heat-shrink material with a fluid weather-proof sealant therebetween; and
   (f) applying heat to shrink said sleeve of heat-shrink material onto said core in an evacuated chamber so as to avoid gaseous entrapments and voids between said core and said shrunk sleeve.

* * * * *